(12) United States Patent
Liu

(10) Patent No.: US 7,183,679 B2
(45) Date of Patent: Feb. 27, 2007

(54) ANTI-LOOSE DEVICE FOR A MOTOR

(75) Inventor: Wen-Hao Liu, Taipei (TW)

(73) Assignee: Asia Vital Component Co., Ltd., Kaohsiung (TW)

(*) Notice: Subject to any disclaimer, the term of this patent is extended or adjusted under 35 U.S.C. 154(b) by 0 days.

(21) Appl. No.: 11/056,097

(22) Filed: Feb. 14, 2005

(65) Prior Publication Data
US 2006/0181174 A1 Aug. 17, 2006

(51) Int. Cl.
*H02K 7/14* (2006.01)

(52) U.S. Cl. ...................................... 310/67 R; 310/90
(58) Field of Classification Search ................... 310/91, 310/90, 67 R, 254
See application file for complete search history.

(56) References Cited

U.S. PATENT DOCUMENTS

| 5,363,003 | A | * | 11/1994 | Harada et al. ............. 310/67 R |
| 5,436,519 | A | * | 7/1995 | Takahashi et al. ........... 310/217 |
| 6,107,717 | A | * | 8/2000 | Lin et al. ....................... 310/90 |
| 6,759,772 | B1 | * | 7/2004 | Chang et al. .............. 310/67 R |

* cited by examiner

Primary Examiner—Darren Schuberg
Assistant Examiner—Nguyen N. Hanh

(57) ABSTRACT

An anti-loose device for a motor includes a hollow shaft and a motor set. The hollow shaft seat, being provided with a recess and the motor set has an insulation frame, a silicone sheet and a locating member disposed between the insulation frame and the recess. The locating member has an engaging part, a first end part and a second end part and the engaging part is inset the recess with the first and the second end parts resisting the shaft seat and the upper edge of silicone steel sheet respectively so as to generate a function of locating the motor set.

12 Claims, 6 Drawing Sheets

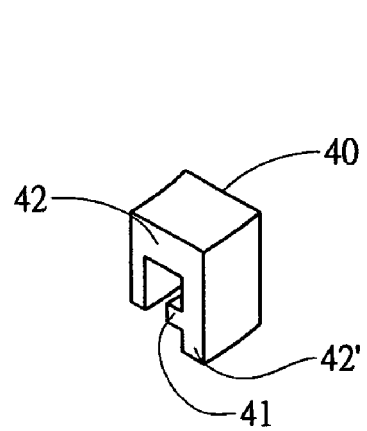
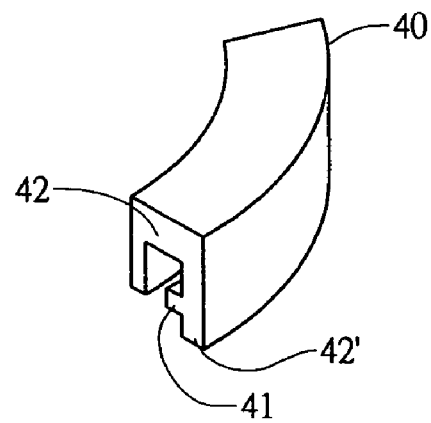
FIG 9      FIG 10
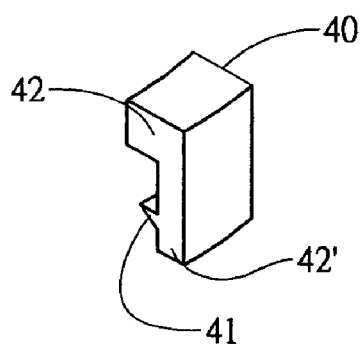
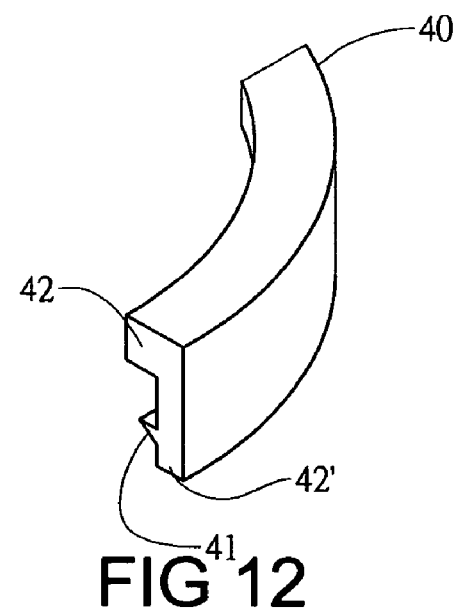
FIG 11     FIG 12

ANTI-LOOSE DEVICE FOR A MOTOR

BACKGROUND OF THE INVENTION

1. Field of the Invention

The present invention is related to an anti-loose device for a motor and particularly to a device, which is formed by way of a locating member provided at the shaft seat of the motor to secure the motor so as to avoid the motor occurring a phenomenon of loosening.

2. Brief Description of the Related Art

Due to computer information industry progressing rapidly, the central processing unit (CPU) in the information product provides faster speed of operation and it results in more heat generation. In order to remove the heat effectively, heat dissipation device is one of least basic equipment in the information product. The most popular heat dissipation device is the cooling fan because of the cooling fan being used extremely conveniently and cheaper. For quality of a cooling fan, it depends on running condition of the motor and the whole system or device being in a state of normal running is completely affected by the motor performance being running steady or not. The bearing in the motor further is a key factor influencing quality and steadiness of the motor.

Conventionally, the stator is adhered to shaft seat of the fan base with coated glue but the coated glue is easy to become peeling off resulting from vibration during the motor running. Consequently, the motor moves away the original location to affect ruing performance of the motor to occur side effect such as more serious vibration, louder noise, more heat generation and power useless consumption.

Taiwanese Patent Official Gazette No. 566757 discloses secure device for the stator in a motor, which has a retaining part composed of a locating part and a holding part. The holding part is inset to a recess groove of a sleeve and the locating part presses top of a coil seat on the stator. However, the preceding sleeve and the coil seat are different in height so that the inconsistent heights have to be counted during the locating part being made and it results in difficulty in the process of fabricating the locating part and fabrication cost increase. Besides, although the specification recites the locating part extends to a lateral side toward the coil till the whole coil of the stator to avoid the coil and the rotor being friction each other. However, the locating part extending to cover the entire coil moves the position of friction to the locating part as long as the coil and the rotor friction each other. In this way, noise is created and it is obvious the prior art is contradicted. Not only the retaining part has to be increased material thereof but also heat generating from motor running must be not easy to dissipate because of locating part extending to cover the whole coil.

SUMMARY OF THE INVENTION

A primary object of the present invention is to provide an anti-loose device for a motor, which has at least a locating member at the shaft seat of the motor to intensify support for the stator and prevent the motor from loosening.

Another object of the present invention is to provide a an anti-loose device for a motor, which can exert a pre-pressure to a bearing received in the shaft seat by way of the locating member extending to inside the shaft seat so as to keep the bearing in a state of steady running.

BRIEF DESCRIPTION OF THE RAWINGS

The detail structure, the applied principle, the function and the effectiveness of the present invention can be more fully understood with reference to the following description and accompanying drawings, in which:

FIG. 9 is a further semi-sectional perspective view of the locating member shown in FIG. 6;

FIG. 10 is a further semi-sectional perspective view of the locating member shown in FIG. 6;

FIG. 11 is a further semi-sectional perspective view of the locating member shown in FIG. 3;

FIG. 12 is a further semi-sectional perspective view of the locating member shown in FIG. 3.

DETAILED DESCRIPTION OF THE INVENTION

Figure 1:
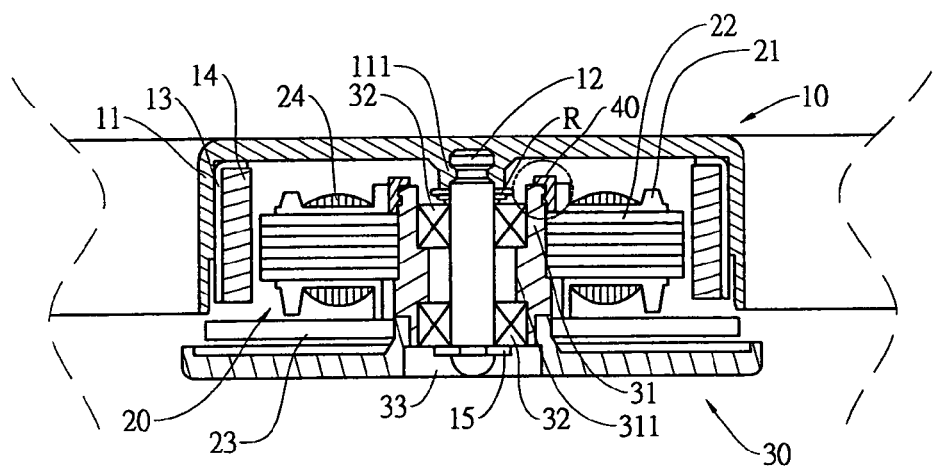
FIG. 1 is a sectional view of the first embodiment of an anti-loose device for a motor according to the present invention.

Referring to FIG. 1, the first embodiment of an anti-loose device for a motor according to the present invention includes a fan blade set 10, a motor set 20 and a fan base 30. The fan blade set 10 is composed of a fan blade hub 11, a spindle 12, a motor case 13 and a magnetic strip. The spindle 12 is joined to a spindle seat 111 formed at the center of the inner bottom of hub 11. The motor case 13 is disposed at the inner lateral side of the hub 11 and the magnetic strip 14 is disposed at the inner lateral side of the motor case 14.

The motor set 20 is attached to the fan base 30 and composed of an insulation frame 21, a silicone steel sheet assembly 22, a circuit board 23 and a coil 24. The silicone steel sheet assembly 22 provides a plurality of silicone steel sheets and is disposed surrounding the insulation frame 21. The fan base 30 has a shaft hollow seat 31 at the center thereof and the circuit board 23 is disposed between the bottom of the insulation frame 21 and the shaft hollow seat 31. The spindle 12 is received in the shaft hollow seat 31 and two bearings 32 are disposed between fit with the spindle 12 and the shaft hollow seat 31. The bearings 32 can be ball bearings and the spindle 12 rotates under support of the bearings 32. A spring R is disposed between the bearing 32 and the hub 11.

The shaft hollow seat 31 has an annular projection 311 at the inner wall surface thereof and the spindle 12 engages with a retaining ring 15 at the end away from the hub 11 such that the bearings 32 are located in place in a way of the upper one of the bearings 32 sitting on top of the projection 311 and the lower one of the bearings 32 closely touching the bottom of the projection 311. A retaining ring 15 is disposed at the bottom of the lower one of the bearings 32 to prevent the spindle 12 from loosening during rotating.

Figure 2:
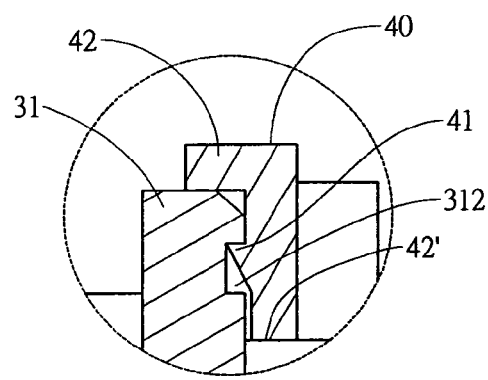
FIG. 2 is an enlarged diagram of the dashed circle shown in FIG. 1.
Figure 3:
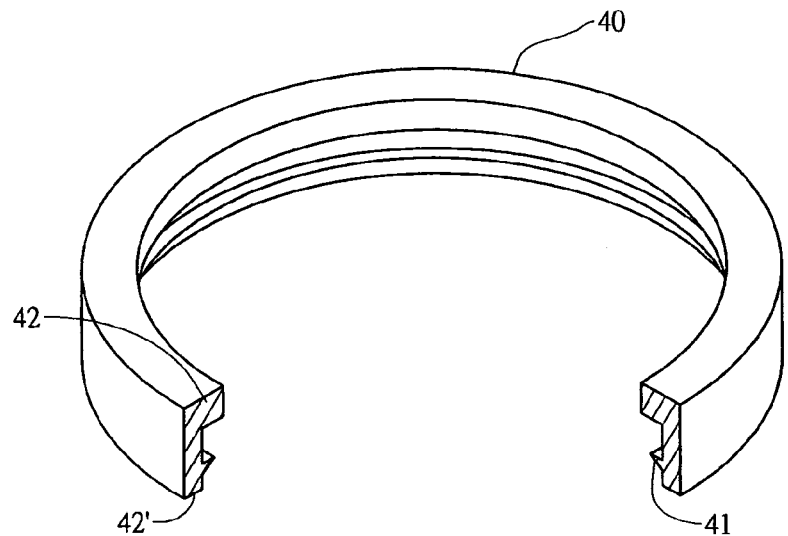
FIG. 3 is a semi-sectional perspective view of the locating member shown in FIG. 2.

Besides, Referring to FIG. 2, the shaft hollow seat 31 has an annular recess 312 and a circular locating member 40 is arranged at the top of the shaft hollow seat and between the outer wall surface of the shaft hollow seat 31 and the insulating frame 21. The locating member 40 basically is provided with a shape of ring as shown in FIGS. 3, 6, 7 and 8 or a shape of individual pieces as shown in FIGS. 9, 10, 11 and 12. The locating member 40 has an L-shaped cross section with a short side 42 and a long side. The short side 42 presses against the top of the shaft hollow seat 31 and the lone side 42' presses against the upper edge of the silicone steel sheet assembly 22. The long side 42' protrudes an engaging part 41 corresponding to the annular recess 312 such that the engaging pan 41 is capable of engaging with the recess 312. The engaging parts 41 is wedge-shaped as shown in FIG. 2 or rectangle-shaped as shown in FIG. 5.

Figure 4:
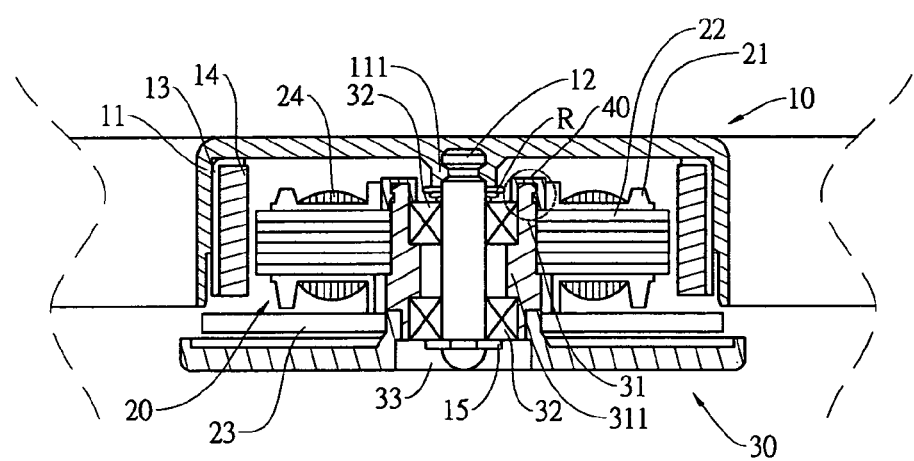
FIG. 4 is a sectional view of the second embodiment of an anti-loose device for a motor according to the present invention.
Figure 5:
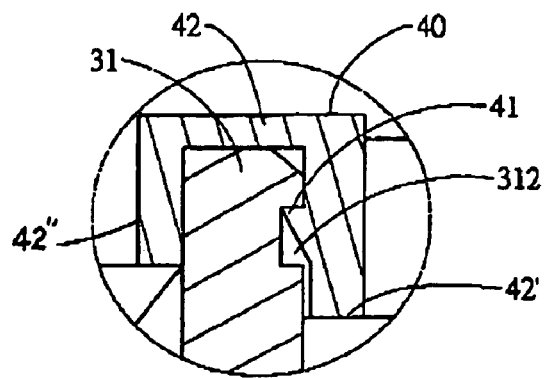
FIG. 5 is an enlarged diagram of the dashed circle shown in FIG. 4.
Figure 6:
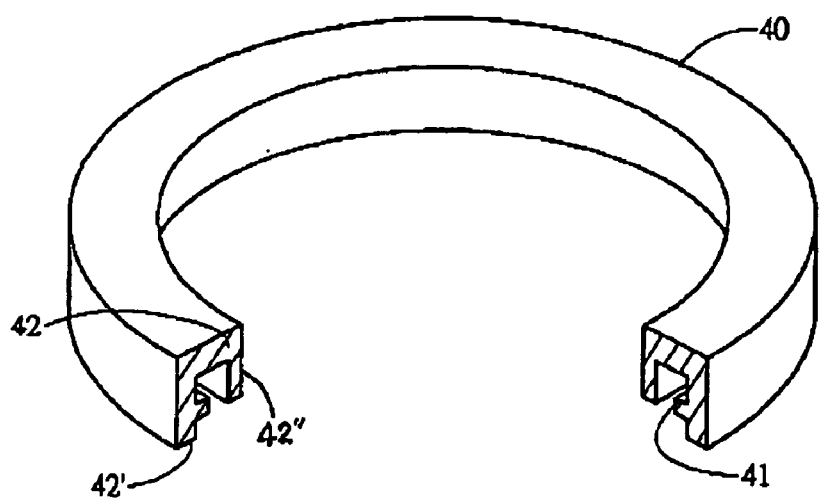
FIG. 6 is a semi-sectional perspective view of the locating member shown in FIG. 5.

Referring to FIGS. 4 and 5, the second embodiment of anti-loose device for a motor according to the present invention is different from the preceding first embodiment in that the circular locating member 40 has a U-shaped cross section with a lone lateral side 42', a short lateral side 42" and an intermediate side 42 joining the two lateral sides 42', 42". The short side 42" extends downward along the inner wall surface of the shaft hollow seat 31 to press against the upper bearing 32 so as to constitute a pre-pressure for the bearing 32 lessening vibration itself and running steadily. If the ball bearing is utilized, internal clearances between the outer ring of the respective bearing 32 and the steel balls in the respective bearing 32 can be avoided such that friction, noise, heat generation and unnecessary power consumption can be decreased for enhancing performance of the motor and prolonging life span of the motor.

Figure 7:
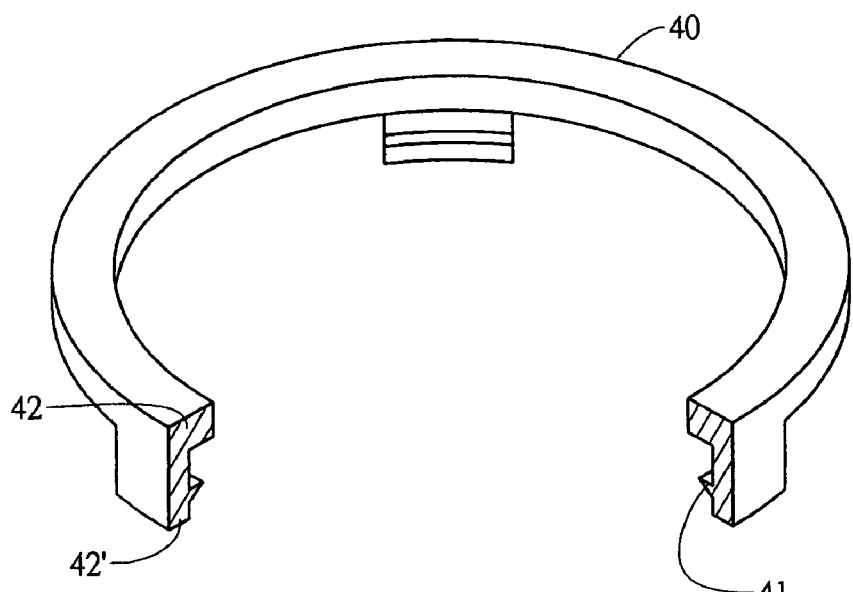
FIG. 7 is another semi-sectional perspective view of the locating member shown in FIG. 3.
Figure 8:
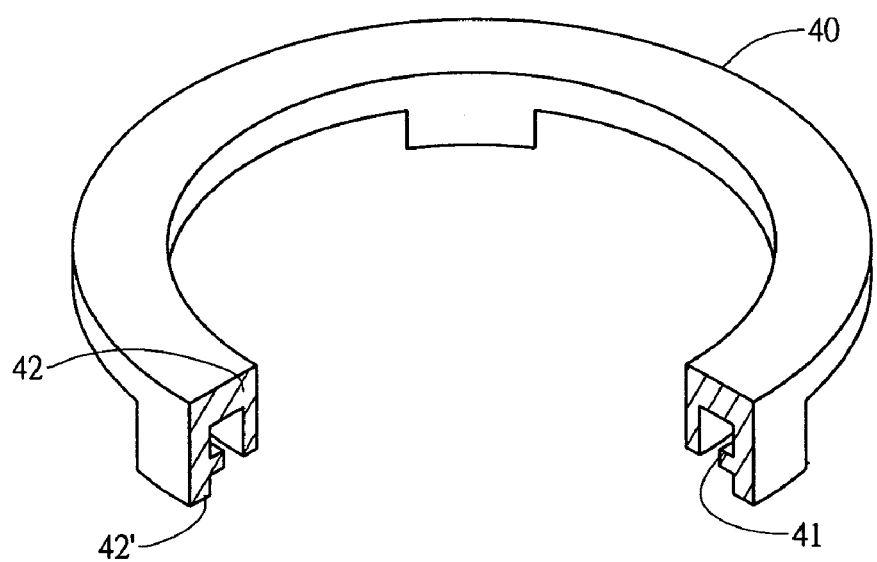
FIG. 8 is another semi-sectional perspective view of the locating member shown in FIG. 6.
Figure 13:
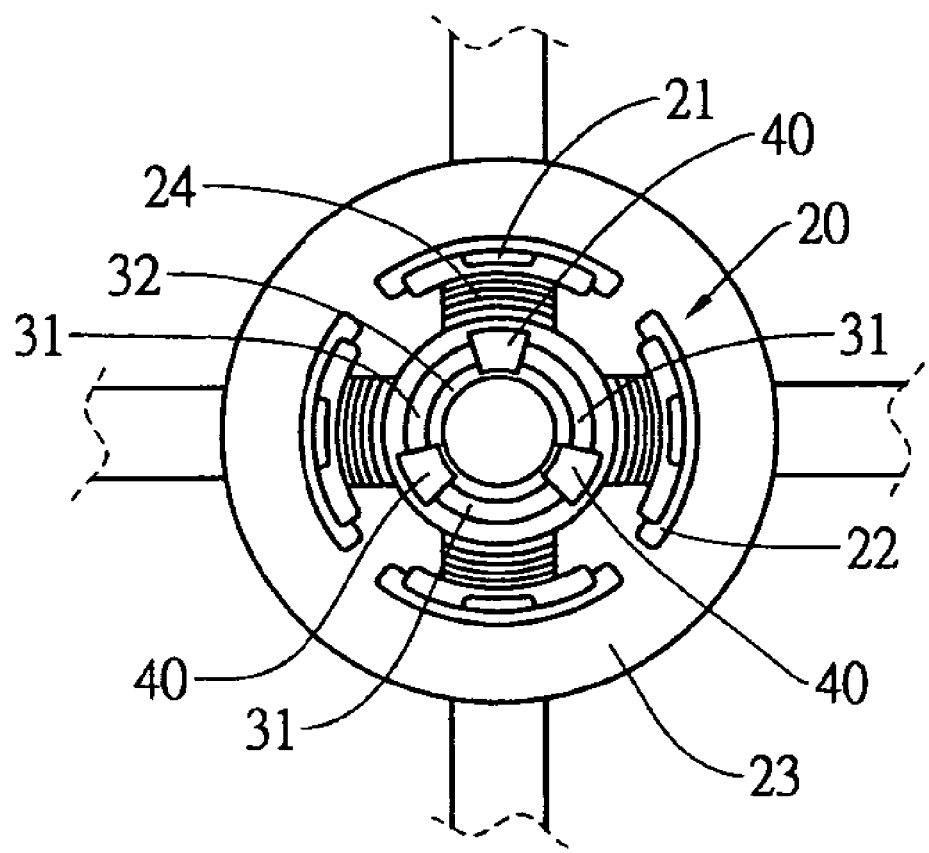
FIG. 13 is a top view illustrating how the locating members shown in FIGS. 9, 10, 11 and 12 being used.

Referring to FIGS. 7 and 8, further embodiments of the circular locating member 40 are illustrated. The locating member 40 shown in FIGS. 7 and 8 is composed of three independent locating member parts, which space apart 120° from each other with the short side of the respective locating member part shown in FIG. 7 or the intermediate side of the respective locating member part as shown in FIG. 8 being integrally joined as a single piece.

Referring to FIGS. 9, 10, 11 and 12, still further embodiments of the circular locating member 40 are illustrated. The locating member 40 is changed to three pieces of independent locating member parts in short radial lengths instead of being integrally joined as a single ring with three locating member parts as shown in FIGS. 7 and 8.

While the invention has been described with referencing to preferred embodiments thereof, it is to be understood that modifications or variations may be easily made without departing from the spirit of this invention, which is defined by the appended claims.

What is claimed is:

1. A motor with anti-loose device, comprising:
    a shaft hollow seat, being cylindrical with an annular projection at the middle section of inner wall surface thereof for a lower bearing pressing against the bottom of the projection and an upper bearing sitting on the top of the projection and being provided with an annular recess at the outer wall near the top thereof; and
    a motor set, having an insulation frame with a circular central part being disposed to surround the shaft seat with a gap spacing from the outer wall surface of the shaft hollow seat and a silicone sheet assembly providing a plurality of silicone sheets being wound with coils and supported by the insulation frame and contacting with the outer wall surface of the shaft hollow seat; and
    a spindle, being located at the center of the shaft hollow seat and fitting with the bearings;
    characterized in that a circular locating member has an L-shaped cross section with a long side and a short side; the long side has a thickness the same as the gap between the outer wall surface of the shaft hollow seat and the insulation frame and an engaging part protrudes from the long side corresponding to the annular recess such that the circular locating member is capable of being located at the top of the shaft hollow seat in a way of being sandwiched between the outer wall surface of the shaft hollow seat and the insulation frame, the engaging part engaging with annular recess and the free end of the long side pressing the top of the silicone assembly and the a short side of the L-shaped cross section is capable of pressing the top of shaft hollow seat.

2. The motor with anti-loose device as defined in claim 1, wherein the engaging part has a wedge-shaped protrusion to engage with the annular recess.

3. The motor with anti-loose device as defined in claim 1, wherein the engaging part has a rectangle-shaped protrusion to engage with the annular recess.

4. The motor with anti-loose device as defined in claim 1, wherein the circular locating member has a ring shaped locating member.

5. The motor with anti-loose device as defined in claim 1, wherein the circular locating member is composed of three independent circular locating member parts spacing apart 120° from each other and each of the locating member parts has the L-shaped cross section with the short side of the respective locating member part being integrally joined as a ring.

6. The motor as defined in claim 5, wherein the three independent circular locating member parts are arranged to have a short radial length respectively instead of being integrally joined as a ring.

7. A motor with anti-loose device, comprising:
    a hollow shaft hollow seat, being cylindrical with an annular projection at the middle section of inner wall surface thereof for a lower bearing pressing against the bottom of the projection and an upper bearing sitting on the top of the projection and being provided with an annular recess at the outer wall surface near the top thereof; and
    a motor set, having an insulation frame with a circular central part being disposed to surround the shaft hollow seat with a gap spacing from the outer wall surface of the shaft hollow seat and a silicone sheet assembly providing a plurality of silicone sheets and being wound with coils and supported by the insulation frame and contacting with the outer wall surface of the shaft hollow seat; and
    a spindle, being located at the center of the shaft hollow scat and fitting with the bearings;
    characterized in that a circular locating member has a U-shaped cross section with a long lateral side, a short lateral side and an intermediate side joining the two lateral sides; the long lateral side has a thickness the same as the gap between the outer wall surface of the shaft seat and the insulation frame and an engaging part protruding from the long side corresponding to the annular recess such that the circular locating member is capable of being located at the top of the shaft hollow seat in a way of the long lateral side being sandwiched between the outer wall surface of the shaft hollow seat and the insulation frame and the engaging part engaging with annular recess; and the free end of the long side presses the top, of the silicone assembly, the intermediate side presses the top of shaft seat and the short lateral side contacts with the inner wall surface of the shaft seat and presses the upper bearing.

8. The motor with anti-loose device as defined in claim 7, wherein the engaging part has a wedge-shaped protrusion to engage with the annular recess.

9. The motor with anti-loose device as defined in claim 7, wherein the engaging part has a rectangle-shaped protrusion to engage with the annular recess.

10. The motor with anti-loose device as defined in claim 7, wherein the circular locating member is a ring-shaped locating member.

11. The motor with anti-loose device as defined in claim 7, wherein the circular locating member is composed of three independent circular locating member parts spacing apart 120° from each other and each of the locating member parts has the U-shaped cross section with the intermediate side of the respective locating member part being integrally joined to each other as a ring.

12. The motor as defined in claim 11, wherein the three independent circular locating member parts are arranged to have a short radial length respectively instead of being integrally joined as a ring.

* * * * *